United States Patent [19]

Tahara et al.

[11] Patent Number: 4,837,713

[45] Date of Patent: Jun. 6, 1989

[54] APPARATUS FOR WARMING UP AUTOMATIC DEVELOPING SYSTEM

[75] Inventors: Toshiro Tahara; Hideo Iwasaki, both of Kanagawa, Japan

[73] Assignee: Fuji Photo Film Co., Ltd., Kanagawa, Japan

[21] Appl. No.: 36,527

[22] Filed: Apr. 9, 1987

[30] Foreign Application Priority Data

Apr. 9, 1986 [JP] Japan ................................ 61-081915

[51] Int. Cl.[4] .......................... H05B 3/02; G02B 0/00

[52] U.S. Cl. .................................... 364/525; 219/331; 219/327

[58] Field of Search ............... 364/477; 237/2 A, 8 A; 219/328, 334, 364, 483, 490, 327, 330, 308, 492

[56] References Cited

U.S. PATENT DOCUMENTS 3,731,729 5/1973 Beatenbough et al. ........ 237/2 A X
3,846,615 11/1974 Athey et al. .................... 219/327 X
3,877,638 4/1975 Amano et al. ...................... 237/2 A
4,088,109 5/1978 Woodruff et al. ............. 123/179 H
4,172,555 10/1979 Levine ............................. 236/46 R
4,723,066 2/1988 Kurokawa et al. ................ 219/331
4,762,980 8/1988 Insley ............................. 219/308 X

*Primary Examiner*—William L. Sikes
*Assistant Examiner*—Akm E. Ullah
*Attorney, Agent, or Firm*—Sughrue, Mion, Zinn, Macpeak & Seas

[57] ABSTRACT

An apparatus for warming up an automatic developing system in which the warming time required for heating a treating liquid up to a predetermined temperature is computed on the basis of sensed treating liquid temperature and the ambient air temperature, and the warming operation is commenced at a time which is obtained by subtracting the computed time length from a set time at which the automatic developing system is to be started, so that the warming is completed by the time at which the developing system is to be started, thus enabling the user to start the treatment of a photosensitive material at the expected time.

12 Claims, 3 Drawing Sheets

APPARATUS FOR WARMING UP AUTOMATIC DEVELOPING SYSTEM

BACKGROUND OF THE INVENTION

The present invention relates to an apparatus for warming up an automatic developing system. More particularly, the present invention is concerned with an apparatus which is capable of completing warm-up of an automatic developing system by the time at which the developing operation is to be commenced.

Automatic developing systems have been known are adapted to automatically perform a series of treatment such as development, fixing and rinsing on photosensitive materials such as photographic films and print papers. Usually, such automatic developing systems are used cyclically such that they are started every morning and stopped in the evening. The temperature of the developing solution in the system, therefore, starts to fall after the stop of operation of the system, so that the system as a whole is cooled down by the next morning. It is, therefore, necessary to warm up the system before it is used. More strictly, it is required that the system be completely warmed up by a time which is a predetermined time before the scheduled commencement of operation of the developing system.

Hitherto, it has been a common practice to set a mechanical or electric timer to start a warming apparatus such that it completes the warming, i.e., the temperature control of the liquid, by a predetermined time before the use of the automatic developing apparatus.

However, since this conventional warming apparatus operates on the basis of an estimated time required for the warming, it is often experienced that the temperature of the developing solution cannot be raised to the required level by the time at which the automatic developing system is to be started, with the result that the user cannot commence the treatment of the photosensitive material at the expected time. This problem will be overcome if the timer is set such that the warming apparatus operates for a longer time. In such a case, however, the warming tends to be finished well in advance of the time at which the developing system is to be started. In consequence, the warming apparatus has to operate wastefully so as to control the liquid temperature at a suitable level, resulting in a wasteful use of the energy such as that consumed by a heater.

SUMMARY OF THE INVENTION

Accordingly, an object of the present invention is to provide an apparatus for warming up an automatic developing system which operates, taking into account temperature data concerning temperature rise of the treating liquid, such as to complete the warming up of the automatic developing system by the time at which the automatic developing system is to be started.

To this end, according to the present invention, there is provided an apparatus for warming up an automatic developing system comprising: temperature sensing means for obtaining temperature data relating to the rise of the temperature of a treating liquid used for treating a photosensitive material in the developing system; setting means for setting the time at which the operation of the developing system is to be started; computing means for computing the time at which the warming up of the developing system is to be commenced, on the basis of the temperature data relating to the rise of the temperature of said treating liquid and the time at which the operation of the developing system is to be started set by the setting means; and control means for commencing the warming up at the time computed by the computing means.

The warming apparatus in accordance with the present invention operates upon detection of temperature data relating to the temperature rise of the treating liquid. The temperature data may include the temperature of the treating liquid itself and the temperature of the ambient air around the automatic developing system. The apparatus has a setting device for setting the time at which the developing system is to be started. The apparatus also has a computing means for computing the time at which the warming is to be commenced, on the basis of the temperature data concerning the temperature rise of the treating liquid and the developing system start time which is set in the setting device. Namely, the computing means computes, in accordance with the temperature data concerning the temperature rise of the treating liquid, the length of time required for warming up the treating liquid to a temperature which is suitable for the treatment, and then computes the time at which the warming operation should be commenced, on the basis of the computed warming time length and the set time at which the developing system is to be started.

The control means then control a circulating pump, a temperature controlling heater and other necessary parts of the warming apparatus such that the warming is commenced at the computed time and is completed by the set time at which the automatic developing system is to be started.

The above and other objects, features and advantages of the present invention will become apparent from the following description of the preferred embodiments when the same is read in conjunction with the accompanying drawings.

DESCRIPTION OF THE PREFERRED EMBODIMENTS

The invention will be more fully understood from the following description of the preferred embodiment.

Figure 3:
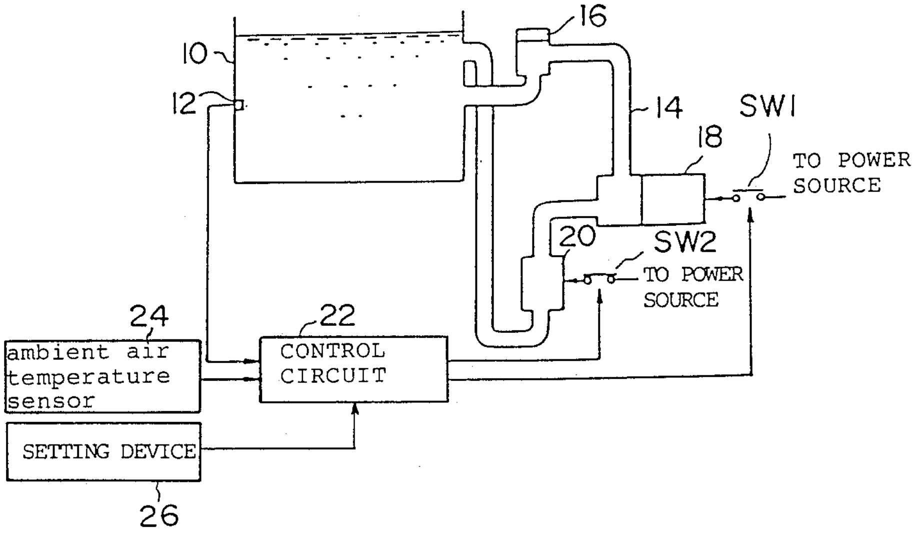
FIG. 3 is a schematic illustration of an essential part of an automatic developing system incorporating a warming up apparatus in accordance with the present invention.

FIG. 3 which is a schematic illustration of an essential portion of an automatic developing system incorporating a warming apparatus of the present invention. As will be understood from this Figure, the automatic developing apparatus has a treating tank 10 accommodating a treating liquid such as a developing solution. A temperature sensor 12 for sensing the temperature of the treating liquid is attached to the inner surface of a wall of the treating tank 10. A circulating line 14 is connected to a wall of the treating tank 10. The circulating line 14 includes a filter 16, a circulating pump 18 and a temperature controlling heater 20 which are arranged in series in the circulating line 14. The circulating pump 18 is driven by an electric motor which is connected to a power supply through a switch SW1, while the temperature controlling heater 20 is connected to the power supply through a switch SW2.

The temperature sensor 12 is connected to a control circuit 22 which incorporates a microcomputer. The control circuit 22 RAMs (Random Access Memories), ROMs (Read Only Memories), a CPU (Central Processing Unit) and BUSes such as data BUS and control BUS. The aforementioned switches SW1 and SW2 are connected to the output port of the control circuit 22. To the input port of the control circuit 22 are connected an air temperature sensor 24 for sensing ambient air temperature, and a setting device 26 through which the user can set the time at which the automatic developing system is to be started. One of the ROMs in the control circuit 22 stores data such as the temperature rise characteristic of the treating liquid with parameters of the ambient air temperature, as well as the program of the control routine which will be explained later. As will be understood from FIG. 2, there is a general tendency that the rate of the temperature rise of the treating liquid in relation to the heating time, i.e., the length of time through which the electric power is supplied to the heater, is increased as the ambient air temperature gets higher. It will also be understood that the time required for heating the treating liquid up to a level T suitable for the treatment is determined definitely provided that the ambient air temperature is constant.

Figure 4:
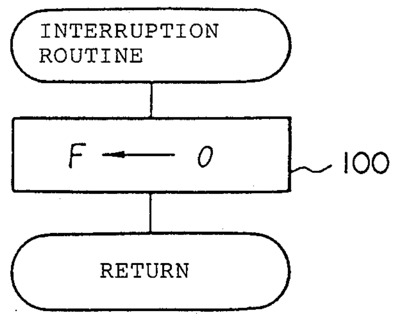
FIG. 4 is a flow chart illustrating interruption routine which is executed in response to an operation of a setting device in the embodiment shown in FIG. 3.

The control routine of this embodiment will be explained with reference to FIGS. 1, 4 and 5. FIG. 4 shows the flow of an interruption routine which is executed when the setting device 26 is operated, i.e., when the time of start of the developing system is set. In Step 100, a flag F is reset in response to the operation for setting the time of start of the developing system.

Figure 1:
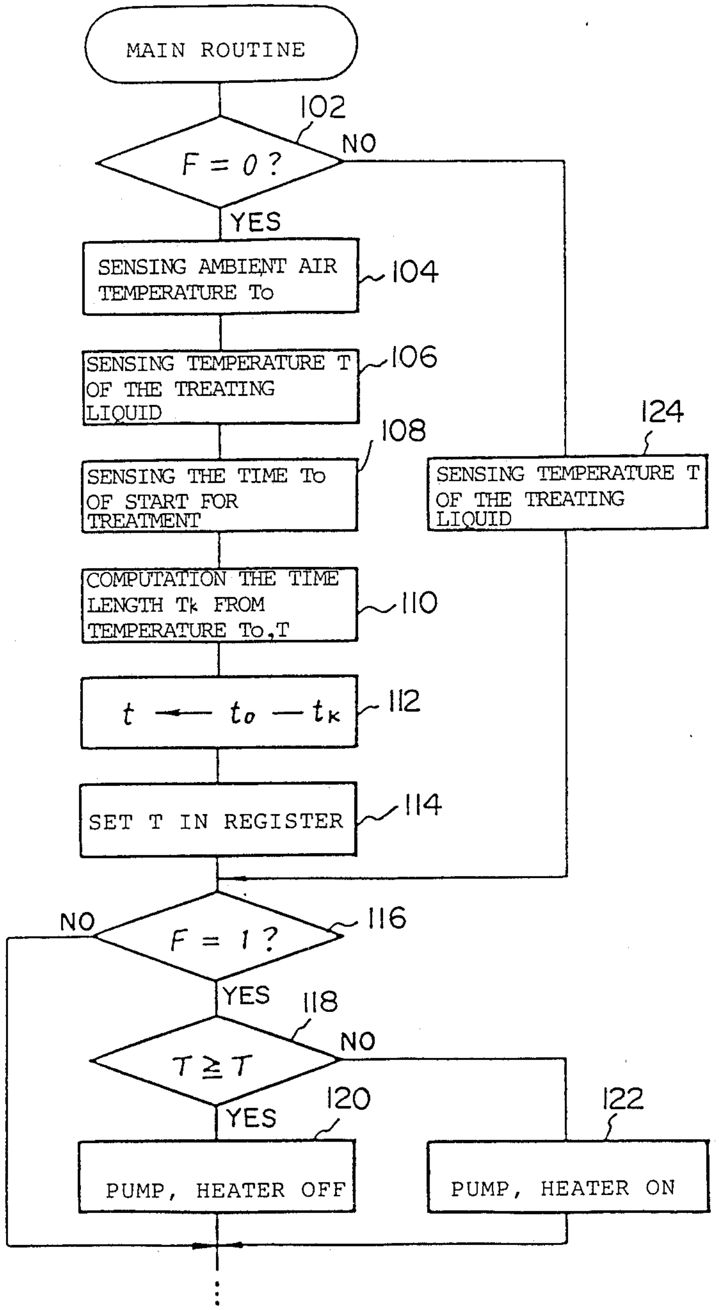
FIG. 1 is a flow chart showing the main routine of an embodiment of the present invention.

FIG. 1 illustrates the main routine which is conducted periodically at a constant period, e.g., 24 msec. In Step 102, a judgment is conducted as to whether the flag F has been reset or not. If the answer is YES, i.e., if the starting time has been set through the setting device, the process proceeds to Step 104 in which is read the instant ambient air temperature $T_0$, which has been sensed by the ambient air temperature sensor 24 and stored as a digital value in the RAM. In Step 106, the CPU reads the instant temperature T of the treating liquid which has been sensed by the temperature sensor 12 and stored as a digital value in the RAM. In the next step which is shown as Step 108, the CPU reads the time $t_0$ of start of the developing system which has been set through the setting device 26.

Figure 2:
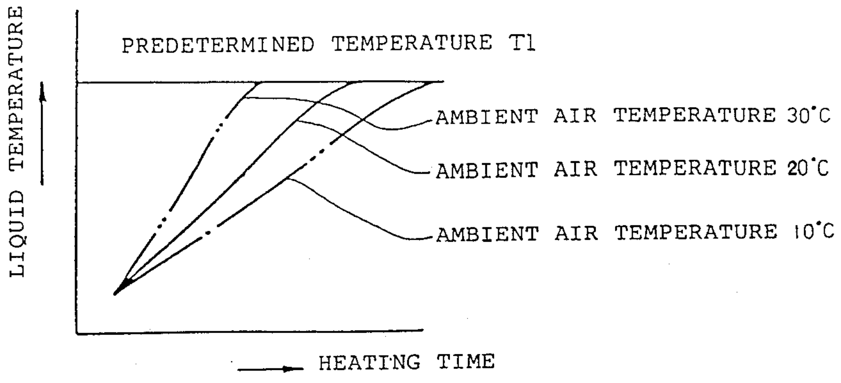
FIG. 2 is a diagram showing change in the temperature of the processing liquid in relation to heating time, i.e., the period through which electric power is supplied to a heater.

The process then proceeds to Step 110 in which a computation is executed to determine the time length $t_k$ which is necessary for heating the treating liquid from the instant temperature up to the temperature $T_l$ suitable for the treatment, in accordance with the temperature rise characteristic data shown in FIG. 2 on the basis of the instant ambient air temperature $T_0$ and the instant liquid temperature T.

In the next step, i.e., Step 112, the computed time length $t_k$ computed in Step 110 is subtracted from the set time $t_0$ at which the developing system is to be started so as to determine the time t at which the warming operation is to be commenced. In Step 114, the thus determined time t is set in a compare register.

Figure 5:
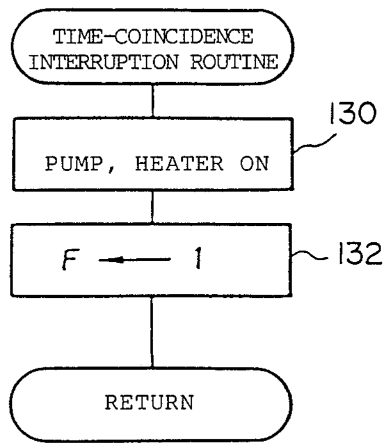
FIG. 5 is a flow chart illustrating a time-coincidence interruption routine in the embodiment shown in FIG. 3.

FIG. 5 shows a time coincidence routine which is executed when the present time has just coincided with the time set in the compare register. As this routine is started, the switch SW1 is turned on in Step 130 so that the circulating pump 18 is started. At the same time, the switch SW2 is turned on so as to allow the power supply to the temperature controlling heater 20. The process then returns to the main routine after the flag F is set in the next step, i.e., Step 132.

Then, a judgment is conducted in Step 116 of the main routine as to whether the flag F has been set. If the answer is yes, i.e., if the flag F has been set, a comparison is conducted in Step 118 between the instant temperature T of the treating liquid and the temperature T suitable for the processing. If the treating liquid temperature T is above the required temperature Tl, the CPU operates to stop the circulating pump 120 in Step 120, while terminating the power supply to the temperature controlling heater. Conversely, if the instant liquid temperature is below a predetermined temperature Tl, the circulating pump is started in Step 122 and the power is supplied to the heater. It will be understood that the operation of the circulating pump and the supply of the power to the heater are maintained from the time of commencement of the warming till the completion of warming because in this period the treating liquid temperature T is still below the required temperature Tl.

If No is the answer to the question posed in Step 102, i.e., if the flag F has been set, the CPU judges that the warming has been commenced. In this case, the temperature T of the treating liquid is taken up in Step 124, and the process proceeds directly to Step 116 and the aforementioned operation is performed by following Steps 116 to 122, thereby to control the liquid temperature T such that it coincides with the required temperature Tl.

As will be understood from the foregoing description, when the time at which the developing system is to be started is set through the setting device, the warming apparatus computes the time at which the warming is to be commenced, on the basis of the instant ambient air temperature and the instant treating liquid temperature, and the operation of the circulating pump, as well as the supply of power to the heater, is commenced when the instant time has coincided with the computed time of commencement of the warming. Once the warming is commenced, the operation of the circulating pump and the supply of the power to the heater are maintained until the treating liquid temperature rises to the same level as the predetermined temperature. After the predetermined temperature is reached, the treating liquid temperature is maintained at the predetermined level by, for example, controlled operation of the heater.

In the actual case, the ambient air temperature, as well as the treating liquid temperature, varies in the period between the moment at which the time for starting the developing system is set and the moment at which the warming is commenced. This means that the time at which the warming is to be commenced actually varies momentarily. Therefore, in the described embodiment of the invention, Steps 104 through 114 are continuously followed so as to momentarily compute and renew the time at which the warming is to be commenced, thus ensuring that the predetermined treating liquid temperature has been reached when the developing system is going to be started.

As will be understood from the foregoing description, according to the invention, the time at which the warming up of the automatic developing system is to be started is controlled in accordance with temperature data concerning the temperature rise of the treating liquid, so that the treatment of the photosensitive material can be commenced without fail at the expected time, while minimizing the energy consumption and avoiding any deterioration of the treating liquid which may otherwise be caused due to inadequate warming up of the liquid.

Although the invention has been described through specific terms, it is to be noted that the described embodiments are only illustrative and various changes and modifications may be imparted thereto without departing from the scope of the invention which is limited solely by the appended claims.

What is claimed is:

1. An apparatus for warming up an automatic developing system comprising:
- temperature sensing means for obtaining temperature data relating to the rise of the temperature of a treating liquid used for treating a photosensitive material in said developing system;
- setting means for setting the time at which the operation of said developing system is to be started;
- computing means for computing the time at which the warming up of said developing system is to be commenced, on the basis of said temperature data relating to the rise of the temperature of said treating liquid and said time at which the operation of said developing system is to be started set by said setting means; and
- control means for commencing the warming up at the time computed by said computing means.

2. An apparatus for warming up an automatic developing system according to claim 1, wherein said temperature data includes the instant temperature of said treating liquid and the temperature of the ambient air around said automatic developing system.

3. An apparatus for warming up an automatic developing system according to claim 1, wherein said computing means computes said time at which the warming up is to be commenced by calculating, on the basis of said temperature data relating to the rise of the temperature of said treating liquid, length of the time required for heating said treating liquid from the instant time up to a predetermined temperature, and subtracting the calculated time length from the set time at which the operation of said automatic developing system is to be started.

4. An apparatus for warming up an automatic developing system according to claim 1, wherein said computing means renews said time at which the warming is to be commenced, in response to any change in said temperature data relating to the rise of the temperature of said treating liquid.

5. An apparatus for warming up an automatic developing system according to claim 1, wherein, after said time at which said automatic developing system is to be started, said control means operates to maintain said treating liquid at said predetermined temperature.

6. An apparatus for warming up an automatic developing system of the type having a liquid circulating means for circulating a treating liquid through a treating tank, and heating means for heating said treating liquid so as to optimize the temperature of said treating liquid for the treatment of a photosensitive material, said apparatus comprising:
- a liquid temperature sensor for sensing the temperature of said treating liquid;
- an ambient air temperature sensor for sensing the temperature of the ambient air around said automatic developing system;
- setting means for setting the time at which the treatment of said photosensitive material is to be started;
- computing means for computing the length of time required for heating said treating liquid up to a predetermined temperature, on the basis of the sensed treating liquid temperature and the sensed ambient air temperature, determining the time at which the warming is to be commenced from the set time for starting the treatment of said photosensitive material and the computed time length required for heating said treating liquid to said predetermined temperature; and
- control means for operating said circulating means and said heating means in accordance with the determined time at which said warming is to be commenced.

7. An apparatus for warming up an automatic developing system according to claim 6, wherein said computing means renews said time at which the warming is to be commenced, in response to any change in said temperature data relating to the rise of the temperature of said treating liquid.

8. An apparatus for warming up an automatic developing system according to claim 6, wherein, after said time at which said automatic developing system is to be started, said control means operates to maintain said treating liquid at said predetermined temperature.

9. An apparatus for warming up an automatic developing system according to claim 6, further comprising:
- memory means storing data concerning the time length required for heating said treating liquid up to said predetermined temperature using the treating liquid temperature and the ambient air temperature as parameters; whereby said computing means computes the length of time required for heating said treating liquid u to said predetermined temperature in accordance with the data stored in said memory means, on the basis of the sensed treating liquid temperature and the sensed ambient air temperature.

10. An apparatus for warming up an automatic developing system of the type having a liquid circulating pump for circulating a treating liquid through a treating tank, and a heater for heating said treating liquid so as to optimize the temperature of said treating liquid for the treatment of a photosensitive material, said apparatus comprising:
- a liquid temperature sensor disposed in said treating tank and adapted for sensing the temperature of said treating liquid;
- an ambient air temperature sensor for sensing the temperature of the ambient air around said automatic developing system;
- setting means for setting the time at which the treatment of said photosensitive material is to be started;
- memory means storing data concerning the time length required for heating said treating liquid up to said predetermined temperature using the treating liquid temperature and the ambient air temperature as parameters;

computing means for computing the length of time required for heating said treating liquid up to a predetermined temperature, on the basis of the sensed treating liquid temperature and the sensed ambient air temperature, and determining the time at which the warming is to be commenced by subtracting the computed time length from the set time for starting the treatment of said photosensitive material; and control means for operating said circulating pump and said heater when the determined time for commencement of warming is reached.

11. An apparatus for warming up an automatic developing system according to claim 10, wherein said heater is disposed in a liquid circulating line in which said circulating pump is disposed.

12. An apparatus for warming up an automatic developing system according to claim 10, wherein said data concerning the time length required for heating said treating liquid is so determined that said time length gets shorter as said ambient air temperature becomes higher.

* * * * *